US009276701B2

United States Patent
Cheng et al.

(10) Patent No.: US 9,276,701 B2
(45) Date of Patent: Mar. 1, 2016

(54) APPARATUS AND METHOD FOR COMMUNICATING FEC MODE AND ALARMING MISMATCH

(71) Applicant: Tellabs Operations, Inc., Naperville, IL (US)

(72) Inventors: Weiying Cheng, Naperville, IL (US); Jeffrey E. Budill, Aurora, IL (US)

(*) Notice: Subject to any disclaimer, the term of this patent is extended or adjusted under 35 U.S.C. 154(b) by 0 days.

(21) Appl. No.: 14/153,597

(22) Filed: Jan. 13, 2014

(65) Prior Publication Data

US 2014/0129907 A1     May 8, 2014

Related U.S. Application Data

(62) Division of application No. 11/531,513, filed on Sep. 13, 2006, now Pat. No. 8,671,331.

(60) Provisional application No. 60/823,524, filed on Aug. 25, 2006.

(51) Int. Cl.
*H03M 13/00* (2006.01)
*H04L 1/00* (2006.01)
*H04J 14/02* (2006.01)

(52) U.S. Cl.
CPC .............. *H04L 1/0041* (2013.01); *H04J 14/02* (2013.01); *H04L 1/0046* (2013.01)

(58) Field of Classification Search
CPC ....... H04L 1/0041; H04J 14/02; H04J 1/0046
USPC ................................................. 714/774, 776
See application file for complete search history.

(56) References Cited

U.S. PATENT DOCUMENTS

| | | | | |
|---|---|---|---|---|
| 5,579,303 A * | 11/1996 | Kiriyama | ....................... | 370/252 |
| 5,856,988 A * | 1/1999 | Kiriyama | ....................... | 714/774 |
| 6,112,325 A * | 8/2000 | Burshtein | ...................... | 714/774 |
| 6,263,466 B1 * | 7/2001 | Hinedi et al. | .................. | 714/755 |
| 6,285,681 B1 * | 9/2001 | Kolze et al. | ..................... | 370/442 |
| 6,477,669 B1 * | 11/2002 | Agarwal et al. | ............... | 714/708 |
| 6,480,475 B1 * | 11/2002 | Modlin et al. | ................. | 370/294 |
| 6,625,777 B1 * | 9/2003 | Levin et al. | ..................... | 714/774 |
| 6,665,831 B1 * | 12/2003 | Yoshida et al. | ............... | 714/774 |
| 6,735,735 B1 * | 5/2004 | Ohira et al. | ..................... | 714/776 |
| 6,912,683 B2 * | 6/2005 | Rifaat et al. | .................... | 714/774 |
| 6,931,009 B1 * | 8/2005 | Agarwal | ..................... | 370/395.1 |
| 6,993,700 B1 * | 1/2006 | Player et al. | .................. | 714/758 |
| 6,996,123 B1 * | 2/2006 | Jiang et al. | ..................... | 370/465 |
| 7,010,180 B2 * | 3/2006 | van Wijngaarden et al. | ... | 385/11 |
| 7,028,241 B1 * | 4/2006 | Blair et al. | ..................... | 714/752 |
| 7,165,207 B2 * | 1/2007 | Olivieri et al. | ................ | 714/774 |
| 7,283,752 B2 * | 10/2007 | Liu | .............................. | 398/152 |
| 7,451,381 B2 * | 11/2008 | Miller et al. | .................. | 714/774 |
| 7,555,700 B2 * | 6/2009 | Takagi | ........................ | 714/774 |
| 7,822,343 B2 * | 10/2010 | Song et al. | ..................... | 398/58 |
| 7,944,941 B1 * | 5/2011 | Bottorff et al. | ............... | 370/466 |
| 2002/0009100 A1 * | 1/2002 | Raghavan et al. | ............. | 370/474 |
| 2003/0072323 A1 * | 4/2003 | Frecassetti et al. | ........... | 370/445 |
| 2004/0268209 A1 * | 12/2004 | Srivastava et al. | ............ | 714/782 |

* cited by examiner

*Primary Examiner* — Joseph D Torres
(74) *Attorney, Agent, or Firm* — Husch Blackwell LLP

(57) ABSTRACT

A multi-mode transmission unit processes data to form an error correction code in accordance with one of a plurality of selectable processes. The data, correction code and a process identifier can be transmitted to a receiving unit which can carry out error correction of the data in accordance with the identified process.

15 Claims, 2 Drawing Sheets

APPARATUS AND METHOD FOR COMMUNICATING FEC MODE AND ALARMING MISMATCH

CROSS REFERENCE TO RELATED APPLICATION

This application is a divisional application of U.S. utility application Ser. No. 11/531,513 filed Sep. 13, 2006 and entitled "Apparatus and Method for Communicating FEC Mode and Alarming Mismatch", incorporated herein by reference, and which claims the benefit of the filing date of U.S. Provisional Application Ser. No. 60/823,524 filed Aug. 25, 2006 and entitled "Apparatus and Method for Communicating FEC Mode and Alarming Mismatch" which is incorporated herein by reference.

FIELD OF THE INVENTION

This invention pertains to optical communication systems. More particularly, the invention pertains to optical transport networks which can incorporate various types of forward error correction.

BACKGROUND OF THE INVENTION

Total traffic volume on optical networks which are in service has over a period of time increased. Additionally, the percent of data traffic versus voice traffic on such networks is continually increasing.

Responsive to ongoing needs for servicing the increasing both data and voice traffic an expanded network architecture has been defined in ITU standard G.872 entitled "Architecture of Optical Transport Networks (OTN)". ITU standard G.709 entitled "Interfaces for Optical Transport Networks" defines an implementation of an optical channel by means of digital framed signals. G.709 provides for the use of forward error correction which is intended to reduce transmission errors on noisy links. This capability in turn facilitates the deployment of longer optical spans. Both ITU G.872 and G.709 are incorporated herein by reference.

The G.709 standard provides for forward error correction using Reed-Salomon RS code. Using such codes, multiple transmission errors can be corrected at the receiving end. G.709 supports only a single FEC mode.

The ongoing development of products which implement the G.709 standard has resulted in a situation where a variety of forward error correction modes need to be supported. These include:

1. Standard FEC mode as defined in ITU G.709;
2. Enhanced vendor-developed FEC modes; and
3. No FEC mode.

There thus is an ongoing need to be able to communicate the FEC mode being used between the respective transmitter/receiver. Preferably, such communication could be implemented without imposing additional overhead on the transmissions while at the same time providing flexibility such that different FEC operational modes can be readily supported between transmitter and receiver, new as yet undefined modes can be incorporated as subsequently developed and multi-mode transmitters and receivers can be readily combined with singular mode receivers and transmitters.

SUMMARY OF THE INVENTION

A method in accordance with the invention establishes a payload data sequence. An error correction code sequence is established. An error correction mode defining sequence is established. The sequences are transmitted to a receiving location so that the receiving location can apply the same error correction code or alerting an operator with an error correction mode mismatch alarm.

DETAILED DESCRIPTION

Figure 1:
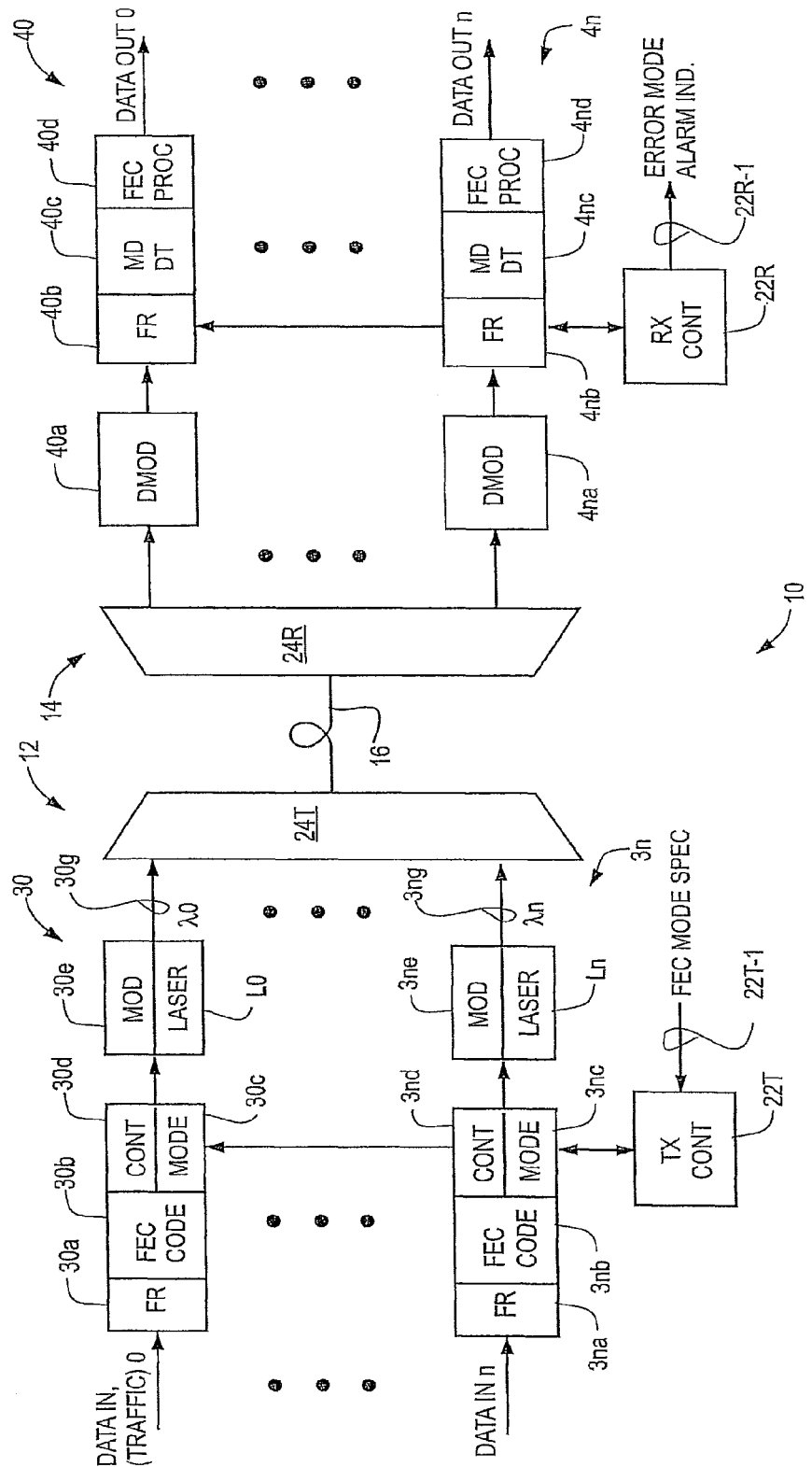
FIG. 1 is a block diagram of a system in accordance with the invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Systems and methods which embody the invention, in a disclosed embodiment, utilize a reserved optical transport unit (OTU) overhead byte to encode the FEC mode. In one aspect of the invention, multi-FEC mode transmitters can be combined with receivers which only support the FEC processing defined in the standard G.709. Alternately, multi-mode receivers and transmitters can be coupled together via an optical channel with the receiver being able to determine the transmitted FEC mode so as to appropriately process the received payload.

An optical communication system which embodies the present invention incorporates at least one FEC encoder which, on a frame by frame basis, combines the coded FEC information with the payload such that the receiver can identify and correct transmission errors. In a disclosed embodiment, the payload portion of the frame as well as the FEC coded portion of the frame are defined in the G.709 standard and would be known to those of skill in the art. No further explanation of them is required.

Further, in accordance with the invention, available reserved overhead bits of a transmitted frame can be used to specify the FEC mode. Those bits can be evaluated by the receiver which can then appropriately process the received payload. The receiver can either update its FEC mode to match the transmitter FEC mode or raise an alarm to alert an operator to manually adjust the FEC mode on either side.

FIG. 1 illustrates a system 10 which embodies the present invention. It will be understood that the system 10 is exemplary only and, other than as explained below, the details of system 10 are not limitations of the present invention. System 10 incorporates a transmitter unit 12 and a receiver unit 14. Transmitter unit 12 and receiver unit 14 are coupled by optical link 16.

Transmission unit 12 transmits a plurality of traffic channels on fiber 16 to receiver unit 14. It will be understood that the specific characteristics of the link 16 are not limitations of the present invention.

Transmitter 12 incorporates a plurality of sources of monochromatic radiant energy, for example lasers L0 . . . Ln. The lasers as would be understood by those of skill in the art each emit monochromatic radiant energy at a specific wavelength such as $\lambda_0, \lambda_1, \lambda_2, -\lambda_n$. For example, the various wavelengths could correspond to those incorporated into multi-channel wavelength division multiplexed (WDM or DWDM) optical communication systems without limitation.

Transmission unit 12 can in one mode of operation, in accordance with the invention, transmit optical payloads on a frame by frame basis to the receiving unit 14. Other transmission protocols also come within the spirit and scope of the present invention.

Transmitter unit 12 can include a control processor and FEC mode specifying circuitry 22T. FEC modes can be specified by a signal 22T-1.

Transmitter 12 includes data processing circuitry 30 . . . 3n, which could include one or more programmed processors and associated software, which receive data streams, such as traffic information, DATA0 . . . DATAn which are to be transmitted on the respective channel.

The circuits 30 . . . 3n can be substantially identical. Only circuits 30 need be discussed in detail. The processing circuitry 30 includes framing circuitry 30a, FEC encoding 30b as well as FEC mode specifying circuitry 30c, and local control circuits 30d. Each of the circuits 30-3n can be configured to communicate with and operate under the control of processor 22T.

Processed data is coupled to a modulator 30e which in turn controls the output of the respective laser such as laser L0. A modulate data stream such as optical data stream 30g is then coupled to combiner or multiplexer 24T. Outputs from multiplexer or combiner 24T are coupled to the optical fiber 16 and transmitted to a de-multiplexer 24R.

As those of skill in the art will understand a plurality of modulated channels $\lambda_0 \ldots \lambda_n$ can be simultaneously transmitted on the fiber 16. The frames of data transmitted on each of the channels can include the FEC mode specification indicia or other information for use by elements of the receiver 14.

Receiver 14 incorporates a plurality of receiving elements such as elements 40 . . . 4n which could be substantially identical. Only element 40 needs to be discussed.

Element 40 incorporates demodulation circuitry 40a, overhead and framing circuitry 40b, FEC mode detection circuitry 40c, and FEC processing circuitry 40d. Output from the FEC processing circuits 40d, a corrected traffic data stream DATA ONTO, can then be retransmitted or processed as desired. Processing circuitry 40d can respond to the type of received FEC coding, detected by circuitry 40c, where receiver unit 14 can process various FEC modes.

Elements 40-4n can communicate with and operate under the control of Rx Processor 22R. An alarm output 22R-1 can indicate a disparity between an FEC mode supportable by receiver 14 and one or more frames of received data with unsupported FEC coding. System 10 might include additional processing and/or transmitting elements, as would be understood by those of skill in the art, without departing from the spirit and scope of the invention.

Figure 2:
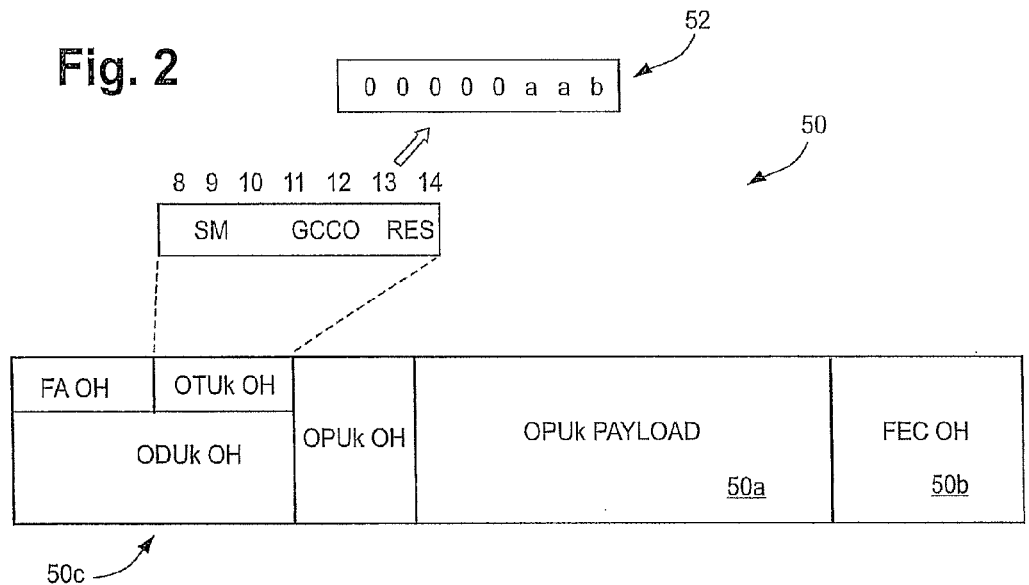
FIG. 2 illustrates characteristics of optical transmission network frames in accordance with the invention.

FIG. 2 illustrates an exemplary frame 50 of a type which could be transmitted, on a per wavelength basis, by the modulated lasers L0 . . . Ln. The frame based outputs from circuitry 3i for example, coupled to the multiplexer 24T, as illustrated in FIG. 2, include a payload section 50a, an FEC overhead section 50b and a general supervisory overhead section 50c. Such frames and associated abbreviations are defined in standard G.709 and would be understood by those of skill in the art.

In accordance with FEC mode specifying information received from controller 22T, each of the mode definition circuits 30c . . . 3nc imparts into a portion of the overhead 50c an identifier of the respective FEC mode to be associated with the respective transmitted frame 50. FEC mode choices can include the standard FEC Reed-Solomon coding, no FEC coding or other types of coding as defined by the controller 22T and the mode defining circuitry 30c . . . 3nc. That mode specifying information is incorporated into reserved overhead bits which form column 13 of reserved overhead byte RES illustrated generally at 52. For example and without limitation the following coding combinations of bits a,a could be used:

00: Standard FEC mode encoding;
01: Enhanced FEC mode encoding;
10: No FEC mode encoding.

The leading five bits could remain set to "0". The trailing bit could be implemented as a parity bit. Other code combinations and locations for the mode specifying indicator come within the spirit and scope of the invention.

The above designation of FEC mode provides flexibility such that a multi-mode transmitting unit 12 could be used with a compatible multi-mode receiving unit 14. On the other hand, if the receiving unit 14 operated only in the standard FEC mode as set forth by G.709 the transmitting unit 12 could then, under control of the controller 22T also operate in the standard FEC mode. In the event that the receiving unit 14 did not support forward error correction, the transmitting unit 12 could operate in the "No FEC mode".

Figure 3:
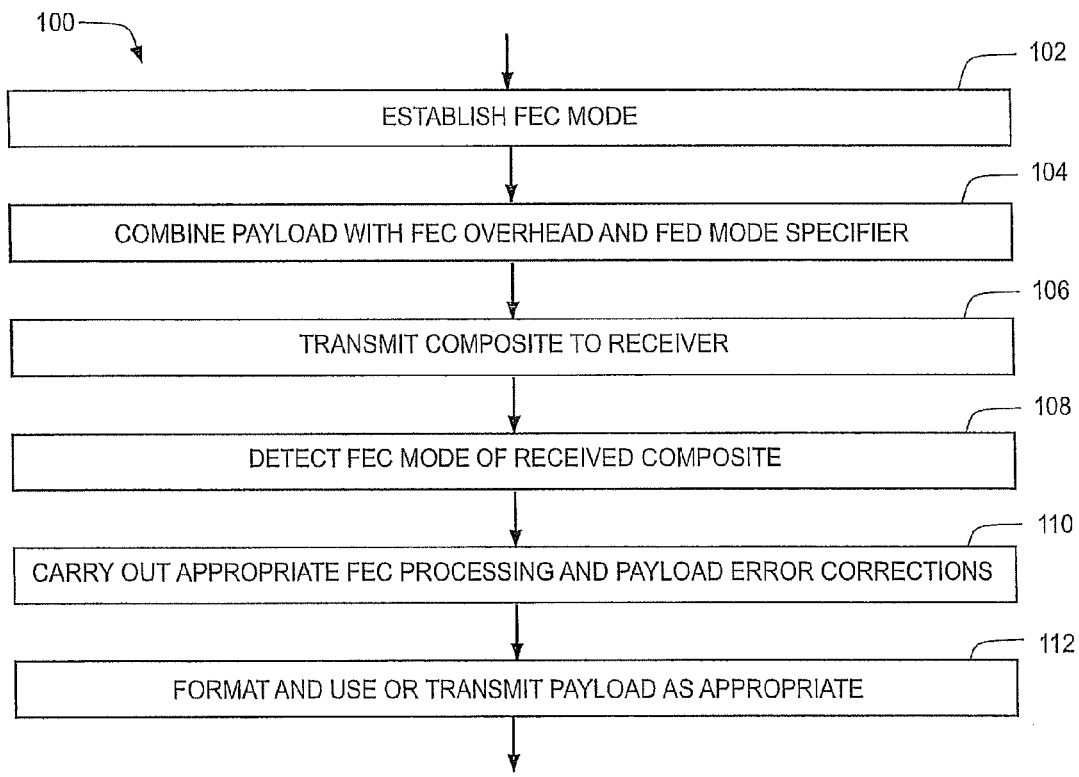
FIG. 3 illustrates a process which embodies the present invention.

FIG. 3 illustrates an exemplary process 100 in accordance with the invention. An FEC mode is established, step 102. A payload can be combined with FEC mode specifying information and coded FEC error correction data, step 104. The payload, FEC mode specification data as well as FEC error correction data and other relevant overhead can be transmitted, for example as a frame, to a receiver, step 106.

The mode specification data can be detected at the receiver, step 108. In accordance with the specified FEC mode, FEC error correction processing can be carried out relative to the payload, step 110. The corrected and processed payload can be formatted and transmitted to another destination, step 112.

The above description it will be understood is exemplary only. The type of FEC which is chosen is not a limitation of the present invention. For example, instead of using Reed-Solomon-type codes, a Bose-Chaudhuri-Hocquenghem type code could be used as an alternate. Other FEC type encoding comes within the spirit and scope of the present invention.

It will also be understood that the details of the transmitting unit as well as the receiving unit are not limitations of the present invention. For example, neither the number of channels, nor the types of modulation, nor the types of lasers are limitations of the present invention.

It will also be understood that the present invention is not limited to optical transport networks as defined in the ITU G.872 and G.709 standards. Other types of optical, or non-optical, transmission networks which incorporate multi-mode forward error correction come within the spirit and scope of the present invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
reserving a byte of a transmission frame for identification of one of a plurality of error correction modes;
determining an error correction mode of the plurality of error correction modes for a data block;
generating an error correction code for the determined error correction mode of data block;

encoding the reserved byte with the generated error correction code; and transmitting the data block, the error correction mode, and the error correction code in a predetermined order within the transmission frame to a receiving location.

2. A method as in claim 1 where transmitting includes optically transmitting.

3. A method as in claim 2 where optically transmitting includes modulating an optical signal of a selected wavelength.

4. A method as in claim 1 where determining the error correction mode includes specifying one of a plurality of error correction modes.

5. A method as in claim 1 where the data block and the error correction mode are transmitted prior to transmitting the error correction code.

6. A method comprising:
reserving a byte of a transmission frame for identifying one of a plurality of error correction modes;
determining an error correction mode data, an error correction code data, and a payload data from a sequence of data;
using the error correction mode data to determine an error correction mode for the error correction code data and the payload data; and
transmitting the error correction code data within the reserve byte of the transmission frame with the payload data within a payload portion of the transmission frame.

7. A method as in claim 6 which includes processing the payload data and the error correction data in accordance with the determined error correction mode.

8. A method as in claim 6 which includes issuing an alert in response to determining the error correction mode.

9. A system comprising:
multi-mode error correction encoding circuitry that implements a plurality of error correction modes;
error correction mode specifying circuitry that specifies one of the plurality of error correction modes; and
a transmitter,
where the multi-mode error correction code circuitry is operable to generate an error correction code for a payload data based on the specified one error correction mode specified by the error correction mode specifying circuitry, and the transmitter is operable to transmit a block of data within a transmission frame, the block of data comprising the payload data processed under the specified error correction mode and the error correction code wherein the error correction code of the specified one of the error correction modes is incorporated into a reserved byte of a transmission frame.

10. A system as in claim 9 where the transmitter is operable to transmit by at least one of: a fiber optic transmission medium and a wireless electro-magnetic transmission medium.

11. A system as in claim 10 where the transmitter is operable to optically transmit the block of data.

12. A system as in claim 10 which includes a modulator operable to modulate an optical signal of a selected wavelength.

13. A system as in claim 9 where the output data and the error correction mode are transmitted prior to transmitting the error correction code.

14. A system as in claim 9 which includes framing circuitry, where the framing circuitry is operable to generate a frame of data comprising the payload data, the error correction mode and the error correction code, and to provide the frame of data for transmission.

15. A method comprising:
determining an error correction mode for a data block from a plurality of error correction modes;
generating an error correction code from the determined error correction mode for the data block;
transmitting the data block, the error correction mode, and the error correction code in a predetermined order to a receiving entity, the error correction code being incorporated into a reserved byte of the data block;
receiving by the receiving entity the data block, the error correction mode, and the error correction code; and
using the error correction mode data to determine an error correction mode process the error correction code data and the payload data.

* * * * *